(12) United States Patent
Skanborg et al.

(10) Patent No.: US 6,206,420 B1
(45) Date of Patent: Mar. 27, 2001

(54) DEVICE FOR INTRODUCING PRESSURIZED GAS INTO A VEHICLE SAFETY DEVICE

(75) Inventors: Torbjörn Skanborg, Hovas; Mehrdad Ranjbar, Alingsas, both of (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 09/066,327

(22) PCT Filed: Oct. 30, 1996

(86) PCT No.: PCT/EP96/04718
§ 371 Date: Aug. 17, 1998
§ 102(e) Date: Aug. 17, 1998

(87) PCT Pub. No.: WO97/16330
PCT Pub. Date: May 9, 1997

(30) Foreign Application Priority Data

Oct. 31, 1995 (DE) .............................. 195 40 618

(51) Int. Cl.⁷ .................................................. B60R 21/26
(52) U.S. Cl. .......................................... 280/737; 137/68.22
(58) Field of Search .................................... 280/736, 737, 280/741, 742; 137/68.13, 68.19, 68.22; 222/3

(56) References Cited

U.S. PATENT DOCUMENTS

| | | | |
|---|---|---|---|
| 3,209,937 | 10/1965 | Hirst et al. | 220/265 |
| 3,743,318 | * 7/1973 | Yamaguchi et al. | 280/737 |
| 4,203,616 | * 5/1980 | Okada | 280/737 |
| 4,289,327 | 9/1981 | Okada | 280/757 |
| 5,290,060 | * 3/1994 | Smith | 280/737 |
| 5,458,368 | * 10/1995 | Cermak | 280/737 |
| 5,474,432 | * 12/1995 | Nilsson | 280/737 |
| 5,642,903 | * 7/1997 | Headley | 280/737 |

FOREIGN PATENT DOCUMENTS

| | | |
|---|---|---|
| 2224617 | 3/1973 | (DE) . |
| 4311276 | 10/1994 | (DE) . |
| 1352053 | 5/1974 | (GB) . |

* cited by examiner

Primary Examiner—J. J. Swann
Assistant Examiner—David R. Dunn
(74) Attorney, Agent, or Firm—Dilworth & Barrese

(57) ABSTRACT

The invention concerns a device for introducing pressurized gas into a vehicle safety device, preferably an air bag, with a pressure container (10) for compressed gas which has at least one opening (12) closed by a gas tight foil cover (14). The foil cover (14) is supported over at least a substantial part of its free surface area in a flat manner by a support device (16) which can be retracted in a direction perpendicular to the opening plane and is in turn supported on the pressure container (10). Via the foil cover (14) the compressed gas generates an outwardly directed force perpendicular to the opening plane, this force acting on the retractable support device (16) and being balanced with a reaction force of the latter. The device has a trigger arrangement (34) which can be activated in the event of an accident and brings about the retraction of the support device (16) such that the reaction force is canceled. When the trigger arrangement (34) has been activated, the support device (16) can first move a distance which is short relative to the opening diameter and then freely over a longer distance, perpendicular to the opening plane.

17 Claims, 2 Drawing Sheets

DEVICE FOR INTRODUCING PRESSURIZED GAS INTO A VEHICLE SAFETY DEVICE

BACKGROUND OF THE INVENTION

The invention concerns a device to allow pressurized gas into a vehicle safety device, preferably an airbag.

For example, how to inflate an airbag with gas escaping from a pressurized gas container is known from GB 2 277 984 A The pressurized gas container has openings via which the pressurized gas can escape in case of a crash in order to inflate the airbag. These openings are sealed gas-tight by means of a disk or film. The disks or film sealing the openings are dimensioned such that they would burst under the force of expansion from the compressed gas contained therein. They are therefore supported by means of a piston that lies outside the openings such that they cannot be destroyed based on the force of expansion of the compressed gas contained in the pressurized gas container. In case of a crash, the pistons supporting the disks or film are moved away so that the disks or film is/are burst by the force of expansion of the compressed gas and the compressed gas is released to inflate the airbag. This safety system presents the disadvantage that the piston serving to support the disk or film cannot be moved away fast enough or cannot be moved at all away from the openings due to existing friction or the risk of tilting so that a delayed and thus too-late inflation of the airbag occurs or, in an extreme case, the airbag cannot be inflated at all in a serious case.

Another device of the type mentioned at the beginning is also known, in which the disks or film is/are dimensioned such that they resist the force of expansion of the compressed gas. In this method of embodiment, in case of a crash, the disks or film is/are destroyed by a punch from a sharp tool controlled by means of a corresponding trigger arrangement so that the compressed gas can be released.

SUMMARY OF THE INVENTION

The object of the invention is, based on the state of the art pursuant to GB 2 277 984 A, to improve a generic device such that it is protected from malfunction with greater security.

Pursuant to the invention, this task is solved by the combination of characteristics in which a device to allow pressurized gas into a vehicle safety device, preferably an air bag, is provided with a pressurized container for compressed gas with at least one opening sealed with a gas-tight film covering, where the film covering is supported, over at least a large portion of its free surface, in a plane by a support device that is retractable in a direction perpendicular to the plane of the opening. The support device is supported, in turn, on the pressurized container. The compressed gas produces a force through the film covering perpendicular to the plane of opening and directed outwardly that acts upon the support device. This force is in equilibrium with the force of reaction of the supporting support device that is retractable. A trigger arrangement can be activated in case of an accident which causes retraction of the support device in a manner such that the force of reaction fails, while after activation of the trigger arrangement, the support device is first moved a short distance relative to the diameter of the opening, in parallel to the plane of the opening, and can then move freely over a longer distance perpendicular to the plane of the opening. According to this, the device, to allow compressed gas to flow into a vehicle safety device, has a pressurized container for compressed gas with at least one opening that is sealed with a gas-tight film covering. This film covering is supported over at least a large part of its surface in a plane by a destructible or retractable support device that is attached, in turn, to the pressurized container. The compressed gas exerts a force perpendicular to the plane of the opening and directed outward that acts on the support device, where this force is in equilibrium with the power of reaction from the support device retractable in a direction perpendicular to the plane of opening. Furthermore the device has a trigger arrangement that can be activated in case of an accident, that causes the retraction of the support device in such manner that the force of reaction fails, while the support device is moved a short distance relative to the diameter of the opening, in parallel to the plane of opening and can then move freely over a longer distance perpendicular to the plane of the opening. This means that the support device is first moved a short distance to the side based on a forced movement, where this distance is determined such that the support device is no longer supported, but rather can fall freely into a corresponding space perpendicular to the plane of opening.

Based on the device pursuant to the invention, it is ensured that the device supporting the film can be moved rapidly and with no risk of hanging in case of a crash, so that the film sealing the opening is destroyed based on the force of expansion of the compressed gas and the release of the opening.

The support device can consist, pursuant to a particular method of embodiment of the invention, of a chassis firmly connected to the pressurized container and a support part connected with it. The support device can be supported by at least three points and the support can be removable at at least one point in the case of a crash so that the support device collapses and releases the film. As an alternative, the support device can be supported along at least two lines on the support frame and the support can be removable along at least one line, whereby again at least one opening of the pressurized container is also released.

At least one portion of the support device can advantageously form a wall component of a chamber that is provided with a pyrotechnic charge that is ignited following a crash so that this wall component is blown away by the pressure created by the ignited pyrotechnic charge, whereby again, the support device is torn away from the position supporting the film covering.

Pursuant to a method of embodiment of the invention that is advantageous in terms of design, the support device has a back-pressure plate essentially forming the support part that is firmly connected to a first part or formed as a unit therewith. In this method of embodiment, the support device also includes a second part that is connected to the chassis supporting the first part, whereby at least the first part extends, in the mounted position, perpendicular to the plane of opening. The support device is destroyed in that the first part is shifted parallel to the plane of opening in relation to the second part and that opposite to the second part, a recess is provided to accept the first part after destruction of the support device. This ensures that this first part cannot clamp underneath the film covering so that the desired release of the film covering is ensured in case of a crash.

In this design embodiment, the first part of the destructible support device can be advantageously formed as a unit with the back-pressure plate in such manner that, together, they form an L-shaped component.

The back-pressure plate can be formed such that its middle region is flattened in accordance with the impact of pressure by means of a safety pressure, i.e., the nominal pressure, that can be set, in such manner that the first part of the support device is moved from its initial position far enough that the entire support device is destroyed.

In the middle region of the first part of the support device, a weakened line running parallel to the plane of opening can be provided so that when a defined stress is exerted on it, the first part folds along the weakened line.

BRIEF DESCRIPTION OF THE DRAWINGS

Further details and advantages of the invention are explained in greater detail based on a method of embodiment presented in the drawing in which.

DESCRIPTION OF THE PREFERRED EMBODIMENTS

Figure 1:
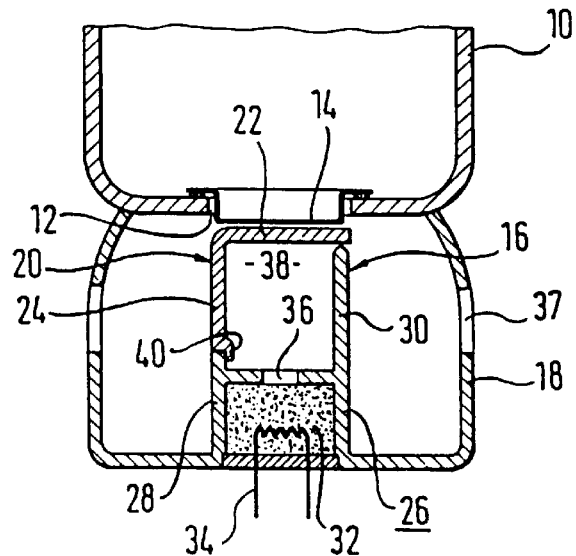
FIG. 1 is a partial cross-section through an initial method of embodiment of the invention.

In FIG. 1, the lower part of compressed gas container 10 is shown; it is filled with a pressurized gas for filling an airbag (not shown here in greater detail). The gas contained in compressed gas container 10 is, for example, under a nominal pressure of 200 bars. Opening 12 is provided in the center of pressurized gas container 10; it is sealed by means of gas-tight film 14. Gas-tight film 14 is dimensioned such that it cannot withstand the pressure of expansion of the pressurized gas by itself. It is therefore supported by support device 16. Support device 16 is formed in housing 18, which connects directly to pressurized gas container 10 and is connected firmly therewith. Support device 16 consists of support part 20, formed as a unit from back-pressure plate 22 and first part 24. The shape of support part 20 is L-shaped. Support part 20 is supported linearly on chassis 26, which forms a part of support device 16 and is connected directly with housing 18 and thus with pressurized gas container 10. Chassis 26 has a second part 28 lying linearly adjacent to first part 24. Support part 20 therefore lies on chassis 26 in such manner that first part 24 of support part 20 connects to second part 28 of chassis 26. Support plate 22 of support part 20 lies with its edge on wall region 30 opposite first part 28, as shown in FIG. 1. Overall, chassis 26 is roughly in the form of a chair, as shown in FIG. 1 as well as FIG. 4. Inside chassis 26, pyrotechnic charge 32 is placed; it can be ignited by means of electrical trigger device 34. Pyrotechnic charge 32 is encapsulated in chassis 26 and opening 36 is provided through which the pressure wave formed after ignition of the pyrotechnic charge can exit. There are multiple openings 36 in housing 18. The gas used to inflate the airbag (not shown here in greater detail) can flow through these.

Figure 2:
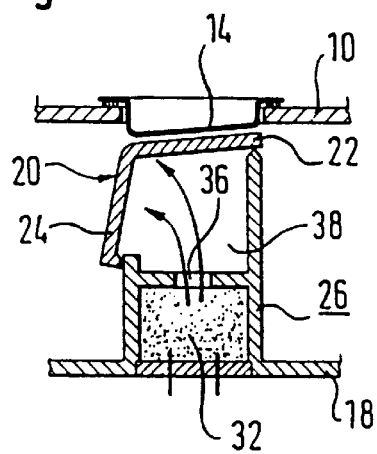
FIG. 2.
Figure 3:
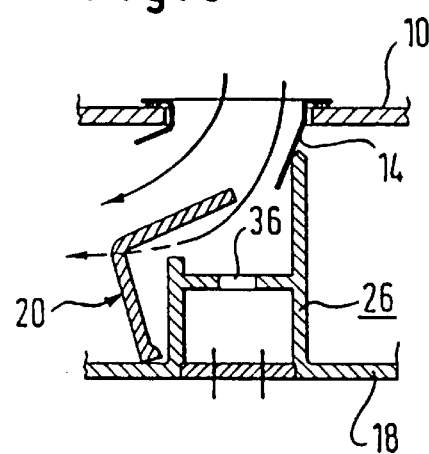
FIG. 3 are details of the method of embodiment pursuant to FIG. 1, in various states.

FIGS. 2 and 3 explain how support part 20 springs outward from its initial position, in which position film seal 14 is supported, after ignition of pyrotechnic charge 32. In FIG. 2, a pressure wave has already developed, which is indicated by the two arrows. Excess pressure forms in chamber 38 formed from support part 24 and chassis 26, so that support part 24 is pressed away from its position. Shaped lip 40 (see FIG. 1) is thus broken off; it is intended to prevent an unintentional side-slip of first part 24 away from part 28. This lip 40 is, however, formed such that it breaks off upon a corresponding pressure impingement and thus facilitates the release of support part 20, as shown in FIG. 3. Support 20, after release, falls into an area next to chassis 26, as shown in FIG. 3. Film covering 14 bursts under pressure from the compressed gas so that the compressed gas flows out of pressurized container 10 and inflates the airbag.

Figure 4:
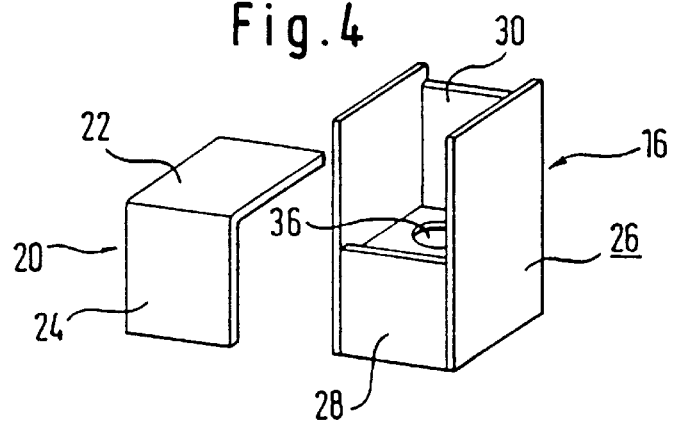
FIG. 4 is a perspective presentation of a detail of the method of embodiment pursuant to FIG. 1.

Based on FIG. 4, the design of support device 16 is again shown in perspective. Disassembled support part 20 on chassis 26 is again shown here in a type of exploded drawing.

Figure 5:
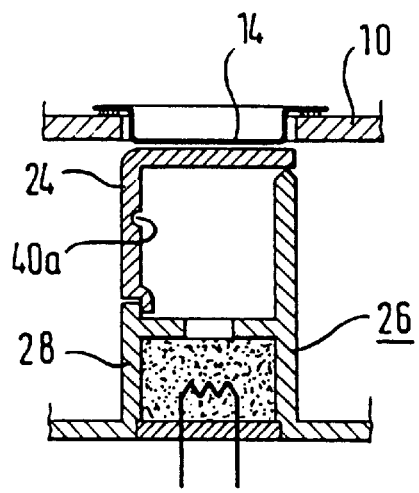
FIG. 5 is a partial cross-section through a second method of embodiment of the invention.
Figure 6:
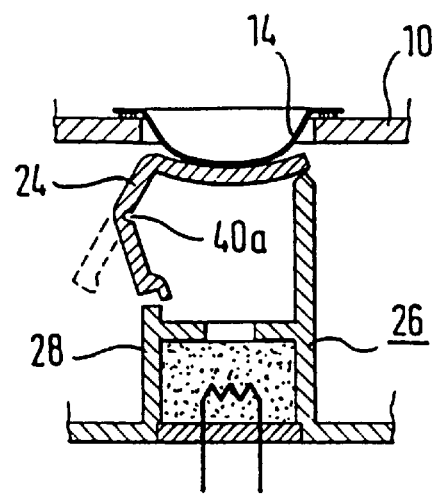
FIG. 6 is the method of embodiment pursuant to FIG. 5 in another position.

FIGS. 5 and 6 show a slightly modified method of embodiment in which weakened line 40a is provided inside first part 24 of support part 20, along which the first part folds upon corresponding pressure exerted by means of the pyrotechnic charge after triggering in case of a crash, as shown in FIG. 6. First part 24 is shown by a dotted line in FIG. 6, if the folding along weakened line 40 does not occur.

Figure 7:
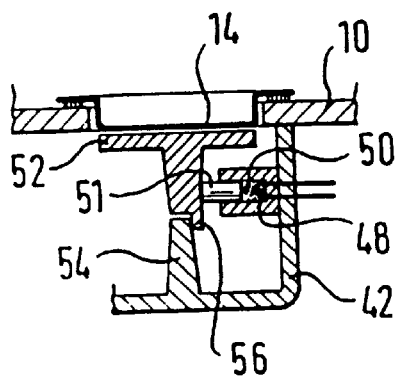
FIG. 7 is a partial cross-section of a third method of embodiment of the invention.

FIG. 7 shows another method of embodiment of the invention. There, the support device consists of back-pressure plate 42 that holds two parts 52 and 54 in the position supporting the film covering by means of excess pressure. Part 52 is T-shaped in cross-section, where one part forms the back-pressure surface and the other part lies linearly on part 54. Part 54 is a wall-shaped part with a trapezoidal cross-section, formed in one unit with mount 42. In turn, lip 56 is formed on part 52; it breaks off upon corresponding impingement by punch 51, based on the ignition of pyrotechnic charge 50, so that part 52 springs away, so that film covering 14 again bursts based on the excess pressure of the gas stored in pressurized container 10.

What is claimed is:

1. Device to allow pressurized gas into a vehicle safety device, comprising a pressurized container for compressed gas with at least one opening sealed with a gas-tight film covering, the film covering being supported, over at least a large portion of a free surface thereof, in a plane of the opening by a support device that is structured and arranged to be retractable in a direction perpendicular to the plane of the opening, the support device being supported, in turn, on the pressurized container, and the support device being structured and arranged such that the compressed gas produces a force through the film covering perpendicular to the plane of the opening and directed outwardly to act on the support device, this force being in equilibrium with a force of reaction of the retractable support device prior to activation, and a trigger arrangement structured and arranged to be activated to cause retraction of the support device, and after activation of the trigger arrangement, the support device is structured and arranged to first move a short distance relative to a diameter of the opening, in a direction parallel to the plane of the opening and then move freely over a longer distance in a direction perpendicular to the plane of the opening.

2. Device pursuant to claim 1, characterized in that the support device is formed as a chassis firmly connected to the pressurized container and a retractable support part connected therewith.

3. Device pursuant to claim 2, characterized in that the support device is structured and arranged to be supported at least at three points on the support chassis and with support thereof eliminatable at least at one point upon activation.

4. Device pursuant to claim 3, characterized in that at least one portion of the support device forms a wall component of a chamber that is provided with a pyrotechnic charge that is ignitable as a result of a crash such that this wall component is structured and arranged to be blown away by pressure produced by the ignited pyrotechnic charge, and the support device is torn away from its position supporting the film covering.

5. Device pursuant to claim 2, characterized in that the support device is structured and arranged to be supported along at least two lines on the support chassis and with support thereof eliminatable along at least one line upon activation.

6. Device pursuant to claim 5, characterized in that at least one portion of the support device forms a wall component of a chamber that is provided with a pyrotechnic charge that is ignitable as a result of a crash such that this wall component is structured and arranged to be blown away by pressure produced by the ignited pyrotechnic charge, and the support device is torn away from its position supporting the film covering.

7. Device pursuant to claim 2, characterized in that at least one portion of the support device forms a wall component of a chamber that is provided with a pyrotechnic charge that is ignitable as a result of a crash such that this wall component is structured and arranged to be blown away by pressure produced by the ignited pyrotechnic charge, and the support device is torn away from its position supporting the film covering.

8. Device pursuant to claim 1, characterized in that at least one portion of the support device forms a wall component of a chamber that is provided with a pyrotechnic charge that is ignitable as a result of a crash such that this wall component is structured and arranged to be blown away by pressure produced by the ignited pyrotechnic charge, and the support device is torn away from its position supporting the film covering.

9. Device pursuant to claim 1, wherein the support device comprises a first part that is T-shaped in cross section and comprising a top forming a back-pressure plate structured and arranged to support the film covering and a stem extending downwardly therefrom and a second part fixedly mounted upon the container and extending upwardly therefrom, with the first part being frangibly mounted upon the second part, and the trigger arrangement comprises a punch structured and arranged to move in the direction parallel to the plane of the opening upon ignition and sever connection between the first and second supporting parts.

10. Device pursuant to claim 9, wherein the trigger arrangement additionally comprises a pyrotechnic charge positioned to move the punch upon activation.

11. Device to allow pressurized gas into a vehicle safety device, comprising a pressurized container for compressed gas with at least one opening sealed with a gas-tight film covering, the film covering being supported, over at least a large portion of a free surface thereof, in a plane of the opening by a support device that is structured and arranged to be retractable in a direction perpendicular to the plane of the opening, the support device being supported, in turn, on the pressurized container, and the support device being structured and arranged such that the compressed gas produces a force through the film covering perpendicular to the plane of the opening and directed outwardly to act on the support device, this force being in equilibrium with a force of reaction of the retractable support device prior to activation, and a trigger arrangement structured and arranged to be activated to cause retraction of the support device, and after activation of the trigger arrangement, the support device is structured and arranged to first move a short distance relative to a diameter of the opening, in a direction parallel to the plane of the opening, and then move freely over a longer distance in a direction perpendicular to the plane of the opening, characterized in that the support device comprises a first support part and a back-pressure plate essentially forming a support part structured and arranged to be connected firmly with the first support part or is formed as a unit with the first support part, and a second support part that is structured and arranged to be connected with a chassis and on which the first support part is supported, the device being structured and arranged such that at least the first support part, in a mounted state prior to activation, extends perpendicular to the plane of the opening, the support device is structured and arranged to be destroyed by the first support part shifting parallel to the plane of the opening in relation to the second support part and opposite the second support part, there is a recess provided to accept the first support part after destruction of the support device.

12. Device pursuant to claim 11, characterized in that the first support part of the destructible support device is formed as a unit with the back-pressure plate in a manner such that an L-shaped component is formed.

13. Device pursuant to claim 12, characterized in that the back-pressure plate is formed in a manner such that a middle region thereof is structured and arranged to be flattened in accordance with impact of pressure by means of a safety pressure, i.e., a nominal pressure, that can be set, in a manner such that the first support part of the support device is moved from its initial position upon activation far enough such that the entire support device is destroyed.

14. Device pursuant to claim 12, characterized in that in a middle region of the first support part of the support device, a weakened line running parallel to the plane of the opening is provided such that upon exertion of a defined stress, the first support part is structured and arranged to fold along the weakened line.

15. Device pursuant to claim 11, characterized in that the back-pressure plate is formed in a manner such that a middle region thereof is structured and arranged to be flattened in accordance with impact pressure by means of a safety pressure, i.e., a nominal pressure, that can be set, in a manner such that the first support part of the support device is moved from its initial position upon activation far enough such that the entire support device is destroyed.

16. Device pursuant to claim 11, characterized in that in a middle region of the first support part of the support device, a weakened line running parallel to the plane of the opening is provided such that upon exertion of a defined stress, the first support part is structured and arranged to fold along the weakened line.

17. Device to allow pressurized gas into a vehicle safety device, comprising a pressurized container for compressed gas with at least one opening sealed with a gas-tight film covering, the film covering being supported, over at least a large portion of a free surface thereof, in a plane of the opening by a support device that is structured and arranged to be retractable in a direction perpendicular to the plane of the opening, the support device being supported, in turn, on the pressurized container, and the support device being structured and arranged such that the compressed gas produces a force through the film covering perpendicular to the plane of the opening and directed outwardly to act on the support device, this force being in equilibrium with a force of reaction of the retractable support device prior to activation, and a trigger arrangement structured and arranged to be activated to cause retraction of the support device, and after activation of the trigger arrangement, the support device is structured and arranged to first move a short distance relative to a diameter of the opening, in a direction parallel to the plane of the opening, and then move freely over a longer distance in a direction perpendicular to the plane of the opening, characterized in that the support device is formed as a chassis firmly connected to the pressurized container and a retractable support part connected therewith, and the support device comprises a first support part and a back pressure plate essentially forming a support part structured and arranged to be connected firmly with the first support part or is formed as a unit with the first support part, and a second support part that is structured and arranged to be connected with the chassis and on which the first support part is supported, the device being structured and arranged such that at least the first support part, in a mounted state prior to activation, extends perpendicular to the plane of the opening, the support device is structured and arranged to be destroyed by the first support part shifting parallel to the plane of the opening in relation to the second support part and opposite the second support part, there is a recess provided to accept the first support part after destruction of the support device.

* * * * *